UNITED STATES PATENT OFFICE 1,993,738

MYRISTYL ESTERS OF POLYCARBOXYLIC ACIDS

George De Witt Graves, Wilmington, Del., and Walter Eastby Lawson, Woodbury, N. J., assignors to E. I. du Pont de Nemours & Company, Wilmington, Del., a corporation of Delaware No Drawing. Application August 31, 1934, Serial No. 742,270

10 Claims. (Cl. 260—103)

This invention relates to new compositions of matter, particularly to esters of myristyl alcohol, and still more particularly to the polycarboxylic acid esters of myristyl alcohol. This case is a continuation in part of copending applications Serial Nos. 543,386 and 543,387, filed June 10, 1931 and 646,298, filed December 8, 1932, which last two applications have resulted in U. S. Patents 1,972,091 and 1,972,092, respectively.

This invention has as an object the provision of processes for the preparation of polycarboxylic acid esters of myristyl alcohol. A further object is the new class of esters thus prepared. Other objects will appear hereinafter.

These objects are accomplished by the following invention wherein myristyl alcohol is reacted with a polycarboxylic acid or an anhydride or a chloride thereof, or an ester thereof with a volatile alcohol preferably in the presence of alcoholysis catalysts.

Polycarboxylic acid esters of myristyl alcohol may be prepared by reacting the alcohol with polycarboxylic acids, their anhydrides or chlorides, or their esters with volatile alcohols or by reacting sodium or other suitable metal salts of the polycarboxylic acid with myristyl halides.

In carrying out the processes of the present invention pure myristyl alcohol may be used, or the commercial form, which is obtained as a by-product in the utilization of alcohols obtained by the carboxyl hydrogenation of coconut oil, palm kernel oil, or similar vegetable oils or oil acids derived therefrom. In general any polycarboxylic acid may be used, including aliphatic dicarboxylic acids such as succinic, adipic, sebacic, maleic; aromatic carboxylic acids such as phthalic, terephthalic, trimesic; substituted - polycarboxylic acids such as tartaric, citric, nitrophthalic, diglycollic; heterocyclic acids such as quinolinic; alicyclic acids such as hexahydrophthalic; etc.

Having outlined above the general purposes and extent of the invention, the following applications of the general principle thereof to certain specific instances are included for purposes of illustration and not in limitation:

Example 1—Dimyristyl phthalate

A mixture containing 296 g. phthalic anhydride, 856 g. of myristyl alcohol, 600 g. ethylene dichloride, and 5.5 g. of sulfuric acid was heated to boiling in an apparatus designed to separate the water from the distillate and to return the ethylene dichloride to the reaction vessel. Distillation was continued until the theoretical amount of water had been removed and substantially all the organic acid had been esterified. The resulting product was washed with sodium carbonate solution to remove the acid, then with water. The product was refined by heating to 150° C. under 50 mm. vacuum to remove the majority of the volatile material. The product was then steamed under the same conditions to remove all traces of volatile material. The resulting product was decolorized with activated carbon and filtered. Dimyristyl phthalate is a water-white oily liquid of extremely high boiling point which slowly solidifies at room temperature.

Example 2—Dimyristyl succinate

A mixture containing 236 g. of succinic acid, 856 g. of myristyl alcohol, 600 g. of ethylene dichloride, and 4 g. of sulfuric acid was heated to boiling in the apparatus described in Example 1. The product was purified and refined as in Example 1. Pure dimyristyl succinate is a white crystalline solid which melts above room temperature.

Example 3—Dimyristyl adipate

Twenty-six grams of dibutyl adipate and 43 g. of myristyl alcohol were heated together with a trace of sodium metal and the liberated butyl alcohol distilled off. The crystalline dimyristyl adipate melted above 35° C.

Example 4—Myristyl acid phthalate

One hundred forty-eight grams of phthalic anhydride and 214 g. of myristyl alcohol were heated together at 120° C. for one hour. The product crystalized when cooled to about 50° C. and analyzed for the calculated acid number.

The myristyl acid phthalate above produced may be further esterified with other alcohols to give mixed esters, e. g., myristyl methyl phthalate, myristyl methoxyethyl phthalate, myristyl butyl phthalate, myristyl stearyl phthalate, myristyl oleyl phthalate, etc.

These mixed esters may also be made by another process as indicated by the following example:

Example 5—Myristyl butyl adipate

A mixture of 26 g. of dibutyl adipate and 22.5 g. of myristyl alcohol were heated at atmospheric pressure and at a temperature of from 117°–150° C. to effect ester interchange. A distillate amounting to 7.5 g., boiling from 117°–120° C. was taken off. At the end of the esterification reaction, the temperature was raised to 190° C. and the pressure reduced to 4 mm. to remove lower boiling components of the reaction mixture. Its odor and boiling range showed it to be butanol. The residue was a yellow material and had a saponification number corresponding to that of myristyl butyl adipate.

Other mixed esters wherein one acid hydrogen is replaced by a myristyl radical and at least one other by the radical of another monohydric alcohol may be made including the mixed esters with aromatic alcohols such as benzyl alcohol; alicyclic alcohols such as cycohexanol: heterocyclic alcohols such as tetrahydrofurfuryl alcohol; ether alcohols such as diethylin, ethoxyethanol, methoxyethanol; etc. The methods of preparation have been shown above, i. e., by reacting an acid ester of myristyl alcohol with the other alcohol, or vice versa; or in the case of more volatile alcohols, by reacting one molecular weight of the neutral ester of the volatile alcohol with one molecular weight of myristyl alcohol.

These esters may be used with cellulose derivatives such as ethyl cellulose and cellulose nitrate for the manufacture of plastic and coating compositions. A composition of ethyl cellulose, resin, dimyristyl phthalate, paraffin wax, and solvent gives a highly moistureproof coating on objects without the wax. Similar coatings without the wax give tough, flexible films. Resins, oils, pigments, other plasticizers of the type of the present invention, or plasticizers common to the art may be added.

The methods for the preparation of the compounds described above are capable of considerable variation, and are not limited to the specific methods described. The esters are generally useful with all types of cellulose derivatives, with natural and synthetic resins, with various pigments and oils, as well as organic fillers, such as wood floor or cellulose in the preparation of plastic and similar compositions.

The following formula is representative of the general type of compound covered by the present invention:

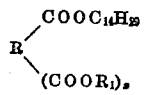

wherein R represents a polyvalent radical either aliphatic, aromatic, or substituted aliphatic or aromatic; $R_1$ represents a radical derived from an alcohol including myristyl, and $x$ is at least one but may be more.

The esters of the present invention may be used in the preparation of plastic compositions or as high-boiling liquids for heat interchange or as lubricants.

Because of their extreme high-boiling point and water resistance, they furnish non-volatile materials useful where common esters are not satisfactory. Because of their general tastlessness, lack of odor, and lack of toxicity, these esters are especially advantageous.

The above description and examples are intended to be illustrative only. Any modification of or variation therefrom which conforms to the spirit of the invention is intended to be included within the scope of the claims.

We claim:

1. An ester of a polycarboxylic acid in which at least one acid hydrogen has been replaced by a myristyl radical.
2. A neutral ester of a polycarboxylic acid in which at least one acid hydrogen has been replaced by a myristyl radical.
3. A neutral ester of a polycarboxylic acid in which each of the hydrogen atoms has been replaced by a myristyl radical.
4. An ester of a dicarboxylic acid in which at least one acid hydrogen has been replaced by a myristyl radical.
5. An ester of a dicarboxylic acid in which each acid hydrogen atom has been replaced by a myristyl radical.
6. A myristyl ester of phthalic acid.
7. Dimyristyl phthalate.
8. A myristyl ester of succinic acid.
9. Dimyristyl succinate.
10. Monomyristyl phthalate.

GEORGE DE WITT GRAVES.
WALTER EASTBY LAWSON